UNITED STATES PATENT OFFICE.

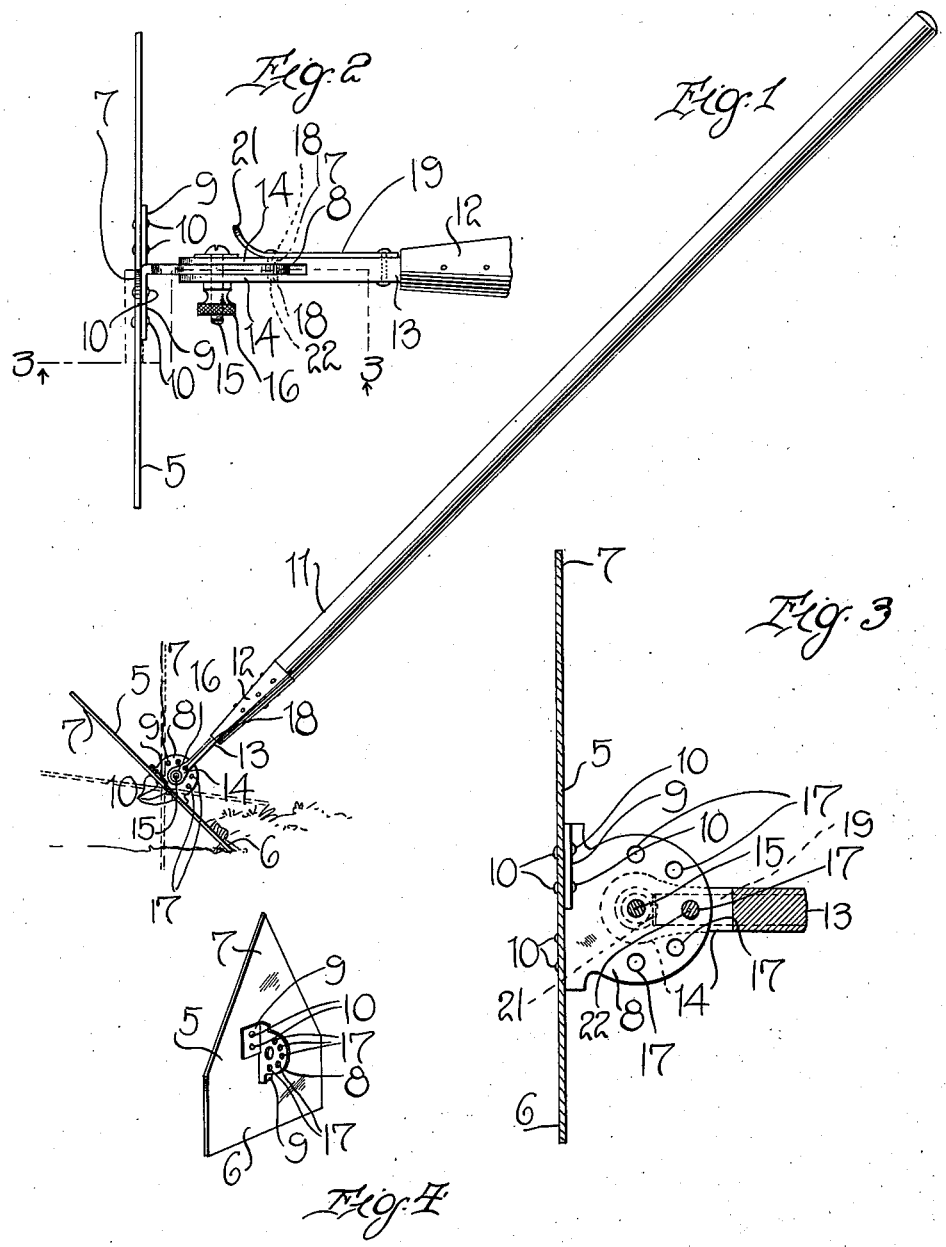

CHARLES A. BRADLEY, OF BURNSTAD, NORTH DAKOTA, ASSIGNOR OF ONE-HALF TO NELS FRISK, OF BURNSTAD, NORTH DAKOTA.

ADJUSTABLE HOE.

1,140,020.   Specification of Letters Patent.   Patented May 18, 1915.

Application filed June 27, 1914. Serial No. 847,692.

*To all whom it may concern:*

Be it known that I, CHARLES A. BRADLEY, a citizen of the United States, residing at Burnstad, in the county of Logan and State of North Dakota, have invented certain new and useful Improvements in Adjustable Hoes, of which the following is a specification, reference being had to the accompanying drawings.

This invention relates to an improved hoe or garden implement, and has for its primary object to provide improved means for adjusting the hoe blade with respect to the handle, whereby the hoe may be used for various purposes.

The invention has for another and more specific object to provide a plate secured upon one side of the hoe blade and provided with a series of openings therein, a handle shank pivotally mounted upon said plate, and means carried by the shank for engagement in any one of said openings to retain the handle in various angular positions with respect to the hoe blade.

The invention has for a further object to produce a device of the above character which is simple and durable in its construction, may be produced at small manufacturing cost, and is of great convenience and serviceability in practical use.

With the above and other objects in view, the invention consists in novel features of construction, combination and arrangement of parts as will be hereinafter referred to and more particularly pointed out in the specification and claim.

For a full understanding of the invention, reference is to be had to the following description and accompanying drawing, in which—

Figure 1 is a side elevation of my improved reversible hoe; Fig. 2 is a plan view thereof; Fig. 3 is a section taken on the line 3—3 of Fig. 2; and Fig. 4 is a detail perspective view of the hoe blade.

Referring in detail to the drawing, 5 designates the hoe blade, which has an end portion 6 of rectangular form in plan and a triangular shaped, tapered or pointed end portion 7. Upon one side of this blade, and approximately at its center, a substantially semi-circular plate 8 is mounted, said plate extending at right angles to the plane of the hoe blade and being provided with oppositely extending ears or lugs 9 which are riveted or permanently secured as at 10 to the blade 5.

The hoe handle 11 is equipped upon one end with a cylindrical metal shank 12 having a tang 13 formed on one end for insertion into the end of the handle and the other end longitudinally split to provide spaced ears 14. Between these ears a semi-circular plate 8 on the hoe blade is received, said ears and the plate being formed with coinciding openings to receive a pivot bolt 15 upon one end of which the clamping nut 16 is threaded. The plate 8 is formed with a semi-circular series of spaced openings 17 concentrically disposed with relation to the pivot bolt. The ears 14 are also provided with openings indicated at 18 which are adapted to register with any one of the openings 17 in said plate.

19 designates a leaf spring which is riveted or otherwise securely fixed at one of its ends to the shank 12. The free end of this spring is outwardly turned to provide a suitable finger piece 21 and adjacent thereto a pin or stud 22 is fixed in the spring plate. It will be understood that the spring 19 normally acts to force the pin inwardly through the openings 18 in the ears 14 and the coinciding opening in the plate 8.

From the foregoing description, the construction, and several advantages of my improved adjustable hoe will be readily understood. By simply pulling outwardly upon the free end of the leaf spring 19, the pin 22 carried thereby may be readily disengaged from the opening in the plate 8 and the hoe blade disposed in various angular positions with respect to the handle, as indicated in dotted lines in Fig. 1 of the drawing. By adjusting the hoe blade to present its squared end to the ground, the blade may be employed as a shovel or spade, while for the purpose of digging, weeding, or transplanting the position of the blade is reversed to present the pointed end 7 thereof to the ground. The edges of the blade are properly sharpened so that weeds and other obnoxious plant growths may be readily cut thereby. The device as a whole is comparatively simple in its construction, and owing to the few parts employed, it will be obvious that the invention is strong and durable in practical use. It is, of course, apparent that the hoe blade may be made in various sizes and other shapes than that illustrated in the drawing.

While I have above described the preferred form, construction, and arrangement of the several elements employed, it will be understood that the device is, nevertheless, susceptible of considerable modification therein, and I therefore reserve the privilege of resorting to all such legitimate changes as may be fairly embodied within the spirit and scope of the invention as claimed.

What is claimed is:

The combination of a hoe blade, a plate of substantially circular form projecting from one face of said blade in a plane at right angles thereto and provided with oppositely extending attaching flanges, a handle, a shank secured in one end of said handle and having a bifurcated end to receive said plate, a pivot bolt extending through the end of the shank and said plate, said plate being provided with a semi-circular series of openings in concentric relation to the pivot, the opposed arms of the bifurcated end of said shank being also provided with openings to register with any one of said openings in the plate, a leaf spring fixed at one of its ends to said shank and having its other end outwardly curved, and a pin fixed to said spring adjacent to its latter end and normally projected by the spring through the coinciding openings in the shank and plate to retain the hoe blade in various angular positions with respect to the shank.

In testimony whereof I hereunto affix my signature in the presence of two witnesses.

CHARLES A. BRADLEY.

Witnesses:
CHAS. HERNETT,
A. V. NORDQUIST.